United States Patent [19]

DeRuiter

[11] Patent Number: 4,646,833

[45] Date of Patent: Mar. 3, 1987

[54] FLOODING TO RECOVER OIL FROM SUBTERRANEAN FORMATIONS AND EMPLOYING INJECTION OF HOT, LOW-VISCOSITY POLYMER SOLUTION THAT BECOMES MORE VISCOUS THAN THE OIL OUT IN THE FORMATION

[75] Inventor: Randall A. DeRuiter, Plano, Tex.

[73] Assignee: Atlantic Richfield Company, Plano, Tex.

[21] Appl. No.: 813,992

[22] Filed: Dec. 23, 1985

[51] Int. Cl.$^4$ .................. E21B 43/24; E21B 43/243
[52] U.S. Cl. .................................. 166/272; 166/261; 166/274
[58] Field of Search ............... 166/261, 272, 273, 274, 166/303

[56] References Cited

U.S. PATENT DOCUMENTS

| | | | |
|---|---|---|---|
| 3,131,761 | 5/1964 | Scott | 166/261 |
| 3,302,713 | 2/1967 | Ahearn et al. | 166/272 X |
| 3,352,358 | 11/1967 | Williams | 252/8.55 D X |
| 3,372,749 | 3/1968 | Williams | 166/274 |
| 3,648,771 | 3/1972 | Kelly et al. | 166/272 |
| 3,802,508 | 4/1974 | Kelly et al. | 166/272 |
| 4,084,637 | 4/1978 | Todd | 166/272 X |
| 4,508,170 | 4/1985 | Littmann | 166/272 |

*Primary Examiner*—George A. Suchfield
*Attorney, Agent, or Firm*—James C. Fails; F. Lindsey Scott

[57] ABSTRACT

An improvement in a method of recovering oil by injecting a viscous aqueous solution comprising injecting the viscous aqueous solution through a thermally stimulated zone near the injection well so as to obviate loss of production of oil because of decreased injectivity of the high viscosity polymers solution.

5 Claims, No Drawings

FLOODING TO RECOVER OIL FROM SUBTERRANEAN FORMATIONS AND EMPLOYING INJECTION OF HOT, LOW-VISCOSITY POLYMER SOLUTION THAT BECOMES MORE VISCOUS THAN THE OIL OUT IN THE FORMATION

FIELD OF THE INVENTION

This invention relates to recovering liquid petroleum hydrocarbons, more commonly called oil, from a subterranean formation. More particularly, it pertains to method of recovering oil by injecting thickened water through an injection well into the formation to displace the oil to a production well for recovery, or production, to the surface of the earth.

BACKGROUND OF THE INVENTION

Oil accumulated within a subterranean formation can be recovered, or produced, through wells from the formation using the energy that is inherent within the formation. However, producing operations deplete the natural energy relatively rapidly. Thus, a large amount of the oil is left in the subterranean formation if only the natural energy is used to produce the oil. This production by depletion of the natural energy is often referred to as primary production. Where natural formation energy is inadequate or has become depleted, supplemental operations, often referred to as secondary or tertiary recovery operations, are used to improve the extent of recovery of the oil. In one of the most successful most widely used supplemental recovery operations, a fluid is injected through an injection means, comprising one or more injection wells. The fluid is passed into the formation, displacing oil within the formation and moving it through the formation. The oil is produced from production means, comprising one or more production wells, as the injected fluid passes from the injection means toward the production means. In a particular recovery operation of this sort, water is employed as the injected fluid, and the operation is referred to as water flooding. The injected water is referred to as flooding water as distinquished from the in-situ, or connate, water.

While conventional water flooding is effective in obtaining additional oil from oil-containing subterranean formations, it has a number of shortcomings. Foremost among the shortcomings is a tendency of the flooding water to "finger" through an oil-containing formation and to bypass substantial portions thereof. By fingering is meant the developing of unstable bulges or stringers which advance toward the production means more rapidly than the remainder of the flooding water. Furthermore, the water does not normally displace as much oil in the portion of the formation which it contacts as it is potentially capable of doing.

It has been established that water floods perform less satisfactorily with viscous oils than with relatively nonviscous oils. The fingering and bypassing tendencies of the water are more or less directly related to the ratio of the viscosity of the oil to the viscosity of the flooding water. The viscosities of different oils vary from as low as 1 or 2 centipoises to as high as 10,000 centipoises or higher. Water has a viscosity of about 1 centipoise.

Past suggestions for increasing the viscosity of flooding water have included incorporating a water-soluble thickening agent in the water. Additives that have been suggested for this purpose include a wide variety of naturally occurring gums, sugars and polymers. The bacterially produced heteropolysaccharides have been especially interesting as an additive for thickening flooding water.

Typical of the prior art approaches are those disclosed in U.S. Pat. No. 3,352,358; "Water Flood Employing Viscous Aqueous Solutions"; issued Nov. 14, 1967 and disclosing the injection of an aqueous solution of polyvinylalcoholsulfate as a viscous fluid for displacing the oil and for improving the mobility ratio. Similarly, U.S. Pat. No. 3,372,749; "Water Flood Process Employing Thickened Water," issued Mar. 12, 1968, disclosed the process for injecting a poly(glucosylglucan), for the same purpose.

While these additives are effective to an extent in increasing the viscosity of the flooding water, they are also characterized by one or more serious disadvantages. Some of the additives are effective only in restricted ranges of pH. Many of the additives form insoluble precipitates with divalent ions, such as calcium ions, either in the flooding water or in the in-situ fluids. A disadvantage suffered by many of the aqueous solutions of these additives is the adverse reduction of viscosity of the aqueous solution when contacted with brines, such as solutions containing sodium chloride or calcium chloride.

One particular disadvantage of these procedures of injecting aqueous solutions of polymers is the diminshed production during the injection of the polymer solution because of the decreased injectivity in the region immediately about the injection means.

Expressed otherwise, the method of injecting the fluid should have the features not heretofore provided:

(1) The method should achieve relatively high injectivity in the region immediately adjacent the injection well, or injection means; but should achieve increased viscosity out in the formation to produce a more nearly equal mobility ratio between the fluid and the oil that the fluid is displacing.

(2) It is particularly desirable that the injection of the fluid does not effect a diminished production of oil during the time of injection of the polymer solution.

SUMMARY OF THE INVENTION

Accordingly, it is an object of this invention to provide an inventive method that achieves one or more of the above delineated features not heretofore provided by the prior art.

It is a specific object of this invention to provide a method which achieves all of the foregoing features not heretofore provided.

These and other objects will become apparent from the descriptive matter hereinafter.

In accordance with one embodiment of this invention there is provided an improved method of water flooding in which an aqueous solution of a polymer is injected through an injection well into the formation to cause production of oil at a one or more production wells thereabout, the improvement comprising injecting a polymer solution through a thermally stimulated, or heated, zone immediately about the injection well such that the polymer will flow through the heated zone at a higher temperature and lower viscosity so as not to reduce the production of oil during the injection of the polymer solution but will develop high viscosity out in the formation.

The method of this invention is operative whether the polymer solution is injected continuously; or in a one time slug; or even a plurality of smaller slugs with a different fluid, such as water, being injected behind the respective slugs of polymer solution; or whether injected in combination with other fluids, miscible or immiscible; or with surfactant solutions.

DESCRIPTION OF PREFERRED EMBODIMENTS

Implicit in the method of this invention is that as a first step, an injection well is thermally stimulated, or heated, as by the injection of steam, electrical heating, or even in-situ burning of hydrocarbonaceous material. The temperature should be elevated from the wellbore proper out to some distance; such as, about at least 5 feet; out into the formation in order to obtain the desired injectivity.

The formation about the wellbore should not be heated so high as to effect degradation of the polymer that will be injected. The highest temperature may be immediately adjacent the well if an electic heater or the like is employed to heat the face of the formation at the wellbore and may diminish to some lower temperature out into the formation. For example, at about 5 feet out into the formation there may be only 200° to 250° F.; whereas adjacent the wellbore the temperature initially may be in the order of 1200° F. or higher. Of course, where in-situ combustion occurs the temperature may range up to the region 2,000° F. or higher. It is immediately apparent that the temperature will drop rapidly as soon as the aqueous solution, whether or not polymer is included is injected past the heated zone, or region of the formation about the wellbore.

The polymer that is selected should be one that is thermally stable at the temperatures that are to be encountered about the heated wellbore being employed for the injection well. Typically such polymers may be the polyacrylamide polymers that are thermally stable and exhibit good temperature-viscosity characteristics. Specifically, the polymer solutions should have a concentration range of at least 0.01 and higher percent by weight of the polymer and should exhibit a viscosity in the range of 10 to 20 centipoises at about 75° F.; yet, should decay to have a viscosity on the range of only 1 to 2 centipoises when heated to 200° F.

Any of the polymers that have been disclosed in the prior art which will give the above characteristics can be employed. The polyacrylamide polymers are known to exhibit these viscosity at temperature characteristics and are satisfactory. The biological polymers such as the polysaccharides can be employed in this invention, also. The poly(glucosylglucans) such as described in U.S. Pat. No. 3,372,749 can also be employed in this invention.

Usually when the above delineated polymers are employed, a concentration in the range of 0.01 to about 0.3 percent by weight will be employed, preferably from about 0.03 to about 0.1 percent by weight. Infrequently higher concentrations may be employed to set highly viscous plugs in a particular zone.

The thickened flooding water may comprise the entire flooding liquid displacing the oil within the subterranean formation toward the production well. Ordinarily, however, a slug of thickened flooding water from about 0.01 to about 0.25 per volume will prove to be economically advantageous in recovering oil from subterranean formation.

Where the biologically active material such as the polysaccharides are employed as the polymer, a bacteriacide such as formaldehyde or sodium pentachlorphenol may be employed in an amount sufficient to prevent or reduce the decay of viscosity through bacterial degradation of the polymer. From this point of view the polyacrylamides are preferred since they are not so readily degraded by bacterial action.

Frequently, the viscosity of the flooding polymer solutions have been thickened by the control of pH in addition to concentration of the polymer such as the bacterially produced polymers. For example, pH ranges may vary widely from as low as 2 to 3 to as high as 12. Preferably, the thickened flooding water is ordinarily maintained at about a neutral pH in the range of 7–10.5 by the addition of economical caustics such as alkali metal hydroxides, alkali metal carbonates which tend to buffer the pH of the flooding water, or even tetrasodiumpyrophosphates.

If desired, a lowered interfacial tension between the flooding water and the in-situ oil may be effected by flooding ahead of the thickened flooding water a slug of a miscible liquid or an immiscible liquid containing dissolved therein a surfactant.

As noted in the prior art, a miscible liquid is a liquid which is miscible with the in-situ oil. Liquid hydrocarbons having boiling points from 30° to 500° F. illustrate suitable miscible liquids. A slug of miscible liquid in the range of 0.01 to 0.1 por volume can be employed. In operation the miscible liquid may displace the oil and form a bank.

A surfactant may be employed in an immiscible liquid like water to reapportion a part of itself into the oil in advance of the immiscible liquid. The surfactant lowers the interfacial tension and thus effects improved recovery of the oil. Illustrative surfactants have been delineated in the prior art for this purpose and include material such as the alkylphenoxypoly(ethyleneoxy)ethanols in which the alkyl group contain 8 to 9 carbon atoms and in which the poly (ethyleneoxy) group contains 3 to 5 ethyleneoxy groups. Several other surfactants have also been delineated; such as, sodium dioctylsulfosuccinate surfactant.

In operation, the water flood, without or without surfactant, is injected through the injection well. If desired, as pointed out hereinbefore, a misciple fluid may be injected in a small slug in front of the water flood, per se, or with the polymer solution. The thickened water containing the polymer is injected through the thermally stimulated injection well with minimal diminishing of the production of oil, since the polymer solution will have its viscosity reduced during injecting and will flow more readily into the formation. Expressed otherwise, the injected polymer solution has a higher injectivity and hence does not diminish the production of oil as much as thickened polymers heretofore employed.

As indicated hereinbefore, the thickened polymer may be injected over a protracted interval of time. It may be necessary to intermittently stop the injection and reheat the zone about the injection well to maintain high injectivity if the polymer solution is to be injected over a prolonged interval of time, since the polymer solution will carry the heat away from the injection well and out into the subterranean formation. As will be readily apparent, as the heat is carried out into the formation, the temperature will diminish and viscosity will build. The increase in viscosity out in a formation is advantageous in that it brings the mobility ratios of the displacing fluid and the in-situ oil more nearly toward one for greatest macroscopic efficiency.

In the event that it is necessary to stop injection of polymer and reheat the wellbore, it can be done by any of the conventional means of heating. Ordinarily, the oil will have been displaced from around the wellbore so that in situ burning does not appear practical absent injecting additional oil to burn about the wellbore. As a consequence, electrical heating such as illustrated in the heating assembly of U.S. Pat. No. 3,372,754 becomes pragmatic. With such an electrical heating assembly, the injection fluid may be employed to carry the heat into the formation.

Having thus described the invention, it will be understood that such description has been given by way of illustration and example and not by way of limitation, reference for the latter purpose being had to the appended claims.

What is claimed is:

1. A method of recovering oil from an oil-containing subterranean formation penetrated by an injection means and a production means which comprises injecting through the injection means and into the formation at least a slug of a hot polymer solution that will reduce its viscosity at elevated temperatures and recover its viscosity when the temperature decreases, the injection being carried out through a thermally stimulated zone extending to at least five feet from the wellhead and having temperatures in the range of only a few degrees above the general formation temperature to more than 250° F., such that the thickened aqueous polymer solution can be injected through the thermally stimulated zone without incurring significant losses in the production of oil from the production means during the injection of the polymer solution through the injection means.

2. The method of claim 1 wherein said region about said production well has a profile of temperatures ranging from only a few degrees above the formation temperature to as high as 250° F. and higher.

3. The method of claim 1 wherein said polymer is employed in an aqueous solution and concentration range of 0.01–3 percent by weight.

4. The method of claim 3 wherein the concentration of said polymer is in the range of 0.03 to about 0.1 percent by weight.

5. The method of claim 1 wherein said polymer solution has a viscosity in the range of 10–20 centipoises or more at 75° F. and reduces to 1–2 centipoises during the injection through the thermally stimulated zone at the temperatures encountered therein.

* * * * *